United States Patent Office 2,934,893
Patented May 3, 1960

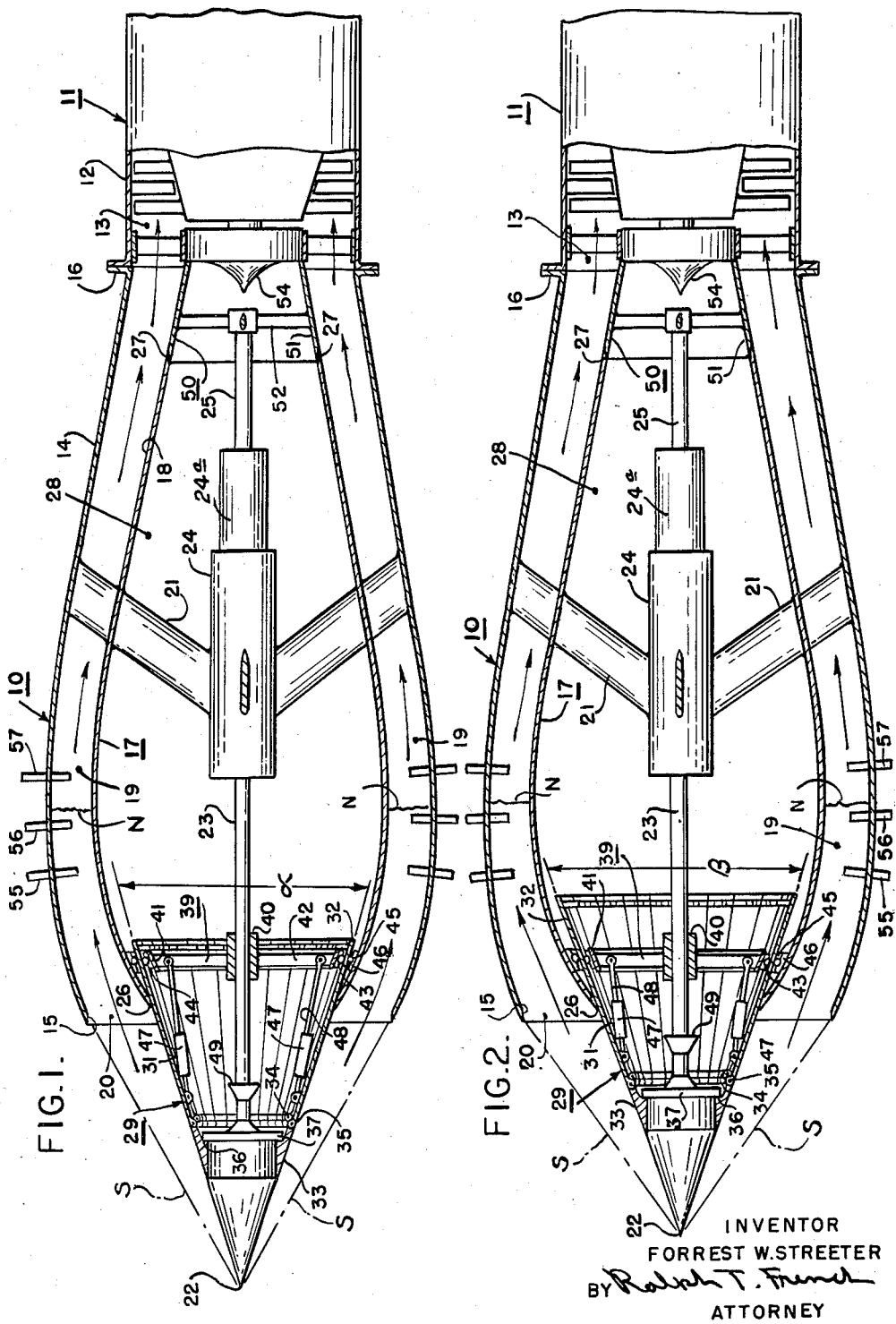

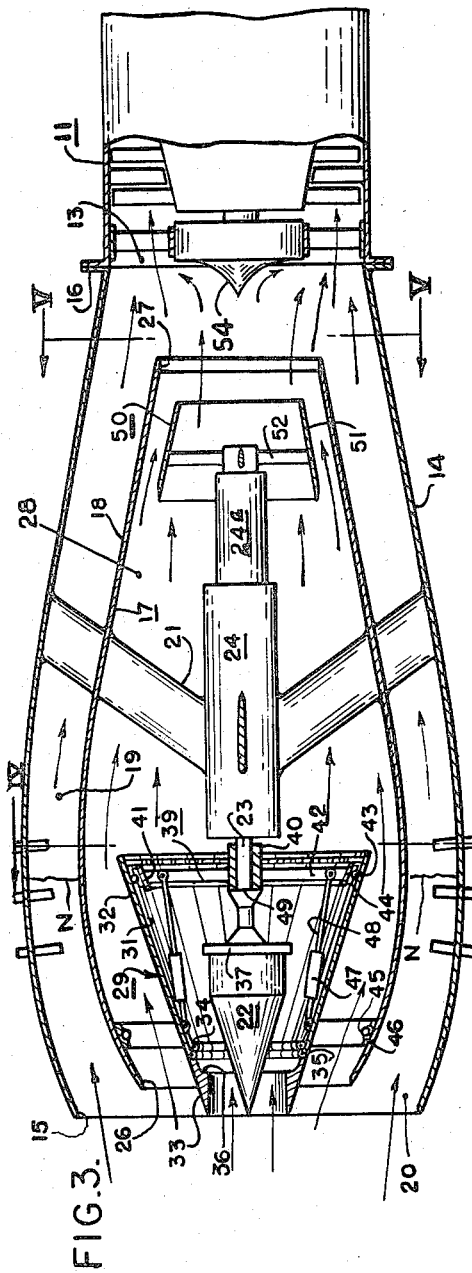
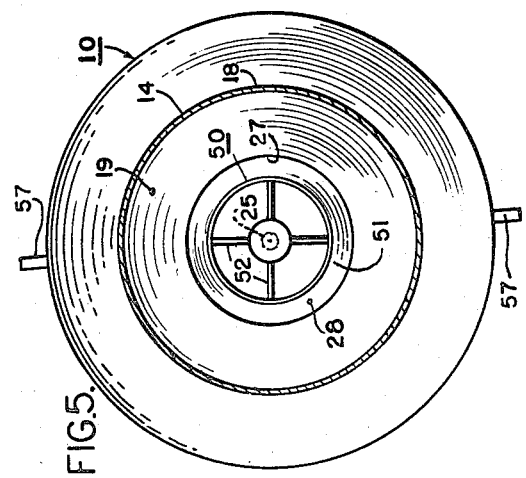
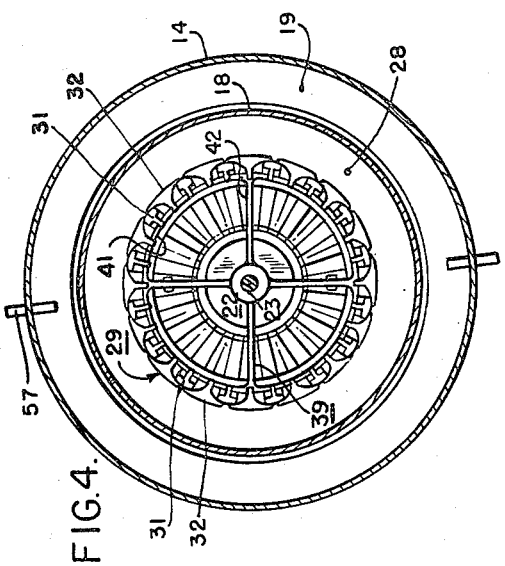

2,934,893

AIR INTAKE STRUCTURE FOR AN AIRCRAFT ENGINE

Forrest W. Streeter, Reform, Ala., assignor to Westinghouse Electric Corporation, East Pittsburgh, Pa., a corporation of Pennsylvania Application May 6, 1957, Serial No. 657,091

3 Claims. (Cl. 60—35.6)

This invention relates to aviation jet propulsion engines, more particularly to aviation jet propulsion engines employed for propelling aircraft at supersonic speeds as well as subsonic, and has for an object to provide an improved air inlet structure therefor which is highly efficient throughout the speed range of the engine.

Jet propulsion engines for propelling aircraft require relatively large air intake openings for proper engine performance at subsonic flight speeds and relatively small air intake openings for proper engine performance at supersonic flight speeds. Accordingly, in jet engines suited for supersonic as well as subsonic flight speeds, variable area intake opening structure is highly desirable.

However, at flight speeds ranging from transonic upwardly into the supersonic, the spike or nose member extending axially forward of the air intake structure becomes highly important, since its primary function is to reflect the oblique shock wave (formed by the incoming air) in such a manner that it is anchored to the lip portion of the primary or supersonic air passageway. Hence, in order to cater to transonic as well as varying supersonic flight speed conditions, it is highly desirable to provide a spike member which is extensible and retractable.

In view of the above it is a further object of the invention to provide an air intake structure having a centrally disposed fairing member provided with an axially positionable spike of tapered contour and having an intermediate structure formed by a group of pivotally interconnected members for providing a continuing air flow surface portion of varying apical angle blending smoothly with the spike member and the body portion, regardless of the axial position of the spike member, and in which the group of interconnected members are jointly movable with the spike member in the transonic and supersonic flight speed range, but in which the spike member is retractable within the body member in the subsonic flight speed range to provide a central opening for admission of additional air to the engine.

Briefly, this invention comprises a substantially bullet-shaped fairing structure coaxially disposed within an outer tubular shell and together therewith defining a primary passageway and having a spike member disposed forwardly of and supported for axial movement by a tubular body portion having a secondary passageway therethrough. Between the spike member and the body portion there is provided intermediate structure including an annular group or array of elongated leaf members pivotally connected at their forward ends and having their rearmost end portions received within the body member. Means is provided for urging the leaf members radially outwardly against the body portion and a connecting member is provided for detachably connecting the intermediate structure to the spike member. Thus, during flight speed conditions ranging from transonic into supersonic, as the spike member is translated axially to the optimum position for a selected speed, the intermediate structure is moved with a following action to maintain a continuing frusto-conical air flow surface blending smoothly with the tapered surface of the spike member and the body structure. The leaf members of the intermediate structure preferably lap each other and are movable jointly to vary the apical angle of the frusto-conical surface to suit the different positions of the spike member, thereby providing a smooth surface for air flowing through the primary passageway.

The spike member is further completely retractible within the body portion to unblock the front end of the latter during subsonic flight conditions and permit additional air to be delivered to the engine through the passageway in the body member and an air outlet opening disposed rearwardly thereof.

The foregoing and other objects are effected by the invention as will be apparent from the following description and claims taken in connection with the accompanying drawings, forming a part of this application, in which:

Fig. 1 is an axial sectional view of an air intake structure for an aviation jet propulsion engine embodying the invention;

Figs. 2 and 3 are views similar to Fig. 1 but illustrating the air intake structure in other operative positions;

Fig. 4 is a transverse sectional view taken on line IV—IV of Fig. 3, looking in the direction of the arrows; and Fig. 5 is a transverse sectional view taken on line V—V of Fig. 3, looking in the direction of the arrows.

Referring to Figs. 1, 2 and 3 of the drawings in detail, especially Fig. 1, there is shown an air intake opening structure, generally designated 10, attached to a typical aviation turbojet engine 11. Only a forward portion of the turbojet engine has been shown, since the engine forms no part of the invention and is merely shown to indicate the manner in which the air intake structure 10 is attached thereto. However, as well known in the art, the jet engine 11 is provided with an outer tubular casing 12 encasing the working components of the engine and having an air inlet opening 13 through which air is admitted to the engine, and subsequently pressurized, burned with a suitable fuel and ejected through a rear exhaust nozzle (not shown) in a rearward direction to provide a propulsive thrust to the engine and to the aircraft (not shown), as well known in the art. In the illustration shown, the jet engine 11 is of the axial flow type. Accordingly, the air inlet 13 is of annular cross-sectional shape and incoming air is directed therethrough in axial streams.

The air intake structure 10 has an outer tubular shell structure 14 having an upstream edge portion or lip 15 and an annular mounting flange 16 at its downstream edge portion, and is attached at the flange 16 to the engine casing 12 in registry with the engine air inlet 13 by nuts and bolts or other suitable means.

An axially-disposed fairing structure, generally indicated 17, preferably of hollow form, is received in the outer shell structure 14 and is provided with a tubular shell or body member 18 of smaller diameter than the outer shell 14 but of similar shape and together therewith defining an annular primary air passageway 19 having an air intake opening 20 and communicating with the engine air inlet 13.

The fairing structure 17 is further provided with a plurality of struts 21 extending outwardly to the outer shell 14 and attached thereto in a manner to support the fairing structure 17 rigidly.

The fairing structure 17 is provided with a conically tapered nose or spike member 22 extending forwardly of the outer shell 14 (when in the positions shown in Figs. 1 and 2) and is supported for axial movement relative to the body member 18 by means of an actuator shaft 23 carried by a power actuator 24 rigidly supported within the body member 18 in a central position. The power actuator 24 may be of any suitable type. Hence, it is not shown in detail and need not be described. However, it will be understood that the actuator 24 may be of the hydraulically controlled reciprocating piston type for actuating the shaft in forward and rearward direction, as desired, in a manner well known in the art. Rearwardly of the actuator 24 and supported thereby is a second actuator 24a, similar to the actuator 24, having a reciprocable shaft 25 extending axially in a direction opposite to that of shaft 23. The body member 18 has a central air inlet opening 26, an air outlet opening 27 and a central passageway 28 communicating with both of the openings.

Under certain conditions of operation, as shown in Figs. 1 and 2, the spike member 22 is disposed in the forwardly extended position. Disposed intermediate the spike member 22 and the body member 18 is an intermediate structure 29 including an annular array of elongated inner and outer leaf members 31 and 32, respectively, hingeably connected to a hub member 33 by pivots 34 and 35 respectively, and jointly defining a continuing frusto-conical surface blending with the outer surfaces of the spike member 22 and of the body member 18. The hub member 33 is disposed coaxially with the shaft 23 and is provided with an annular shoulder 36 extending radially inwardly and cooperating with a radially outwardly extending annular flange member 37 provided on the spike member 22. The leaves 31 and 32 are slidably received within the opening 26 of the body member 18 and are urged in radially outward direction by a spreader member 39 having a hub portion 40 slidably received on the shaft 23 and having an outer annular rim 41 connected to the hub 40 by a plurality of spokes 42. The rim 41 may, if desired, be provided with anti-friction means such as an annular row of balls 43 confined in an annular race 44. In a similar manner, the body 18 may be provided with anti-friction structure including an annular series of rollable balls 45 disposed in an annular race 46. The races 44 and 46 are preferably disposed in the same plane. The spreader member 39 is urged in forward direction (that is, to the left as viewed in the figures) by a plurality of fluid actuated small power actuators 47 of any suitable type.

As illustrated, the power actuators 47 are of the single acting reversible type and each is provided with a reciprocable shaft 48. Each of the power actuators 47 is connected at one end to one of the leaves 32 and has its shaft 48 connected to one of the spokes 42. Thus, since the leaf arrangement 31, 32 defines a frusto-conical surface, when the actuators 47 are energized in a direction to retract their shafts 48, the spreader member exerts a resultant force in radially outward direction urging the leaf members 31 and 32 in diverging direction.

The actuator shaft 23 is further provided with an annular shoulder 49 disposed intermediate the spike member 22 and the spreader hub 40 to control the spreader member 39, in a manner subsequently to be described.

The actuator shaft 25 is utilized to actuate a valve member 50 for blocking and unblocking the air outlet opening 27. The valve member 50 may be of any suitable type; however, as illustrated, it has a tubular member 51 attached to the actuator shaft 25 by a plurality of struts 52 and of sufficient length to extend from the rearward edge portion of the body 18 to the outer periphery of a conical deflector member 54 which together with the body 18 imparts an annular shape to the opening 27.

The position of the normal shock wave N formed at transonic and supersonic air velocities in the inlet throat of the primary passageway 19, is correlated to the oblique shock wave S and may be sensed by means of a series of tubular pressure probes 55, 56 and 57 disposed in axially spaced relation with each other and connected to a Mach meter (not shown) of any suitable type. The probe 56 is located at the optimum position for the shock wave N and probes 55 and 57 are disposed immediately forward and aft thereof, respectively, to sense any deviation therefrom.

During supersonic flight conditions, the air intake structure is in the position shown in Fig. 1, wherein the spike member 22 is at its extreme forward position and the intermediate structure 29 is in blocking relation with the opening 26. The intermediate structure 29 provides a smooth air flow surface of frusto-conical shape having an apical angle α and continuing from the spike 22 to the body 18. Under such conditions, ram air at supersonic velocities is admitted through the air intake opening 20 to the primary passageway 19 and thence through the engine air inlet 13 into the engine to provide the air requirements for the engine. The spike member 22 is positioned at the optimum location to anchor the oblique shock wave S to the intake lip 15 of the passageway 19 for maximum efficiency of the air flow through the passageway 19.

During transonic flight conditions, wherein the velocity of the ram air is lower relative to that of supersonic air flow velocity, the air intake structure is positioned as shown in Fig. 2, wherein the spike member 22 is in a more rearward position than that shown in Fig. 1 and the intermediate structure 29 is disposed in the position shown, blocking the inlet opening 26 and providing a smooth continuing frusto-conical surface having a larger apical angle B than in Fig. 1. This position of the intermediate structure 29 is attained in the following manner: The actuator 24 is actuated in a manner to retract the shaft 23. As the spike member is drawn rearwardly by the actuator shaft 23, the flange 37 on the spike member moves axially in rearward direction. The intermediate structure 29 is urged rearwardly with a following action by the retractive effort of the actuator shafts 48 and since the spreader member 39 cannot move forwardly, it urges the leaves 31, 32 radially outwardly about their pivots 34 and 35. Hence, the hub member together with the leaves 31, 32 are permitted to move rearwardly the same amount as the spike member. Accordingly, the leaves are diverged radially and the spike member 22 is positioned in the optimum position for anchoring the oblique shock wave S of the lower velocity air against the intake lip 15.

During subsonic conditions, the apparatus is in the position shown in Fig. 3, wherein the spike member 22 is in its maximum rearward position and the intermediate structure 29 is in its maximum rearward position, thereby unblocking the air intake opening 26. Also, the valve member 50 is disposed in unblocking relation with the air outlet opening 27, so that ram air is now delivered to the engine inlet 13 by way of the central passageway 28 in addition to the primary passageway 19, in adequate volume to satisfy the engine requirements.

Movement of the spike member 22 and of the intermediate structure 29 from the positions shown in Fig. 2 to the positions shown in Fig. 3 are attained in the following manner: The actuators 24 and 24a are actuated in a manner to jointly move the actuator shafts 23 and 25 to their fully retracted positions. The spike member is thus directly translated by the shaft 23 to the position shown in Fig. 3. As the flange 37 of the spike member is moved rearwardly out of abutment with the shoulder 36 on the hub 33, the actuators 47 are energized to extend their shafts 48. The spreader member 39 is thus moved to its maximum rearward position, thereby permitting movement of the leaves 31 and 32 in converging direction. Subsequently thereto the shoulder 49 on the shaft 23 moves into abutment with the hub 40 on the spreader member 39 and translates the entire intermediate structure 29 in rearward direction to its final position as shown, thereby opening the air intake opening 26. It will be noted that the spike member 22 is retracted sufficiently to permit additional air to flow through the area circumscribed by the hub member 33.

Concomitantly therewith, the actuator shaft 25 moves the valve member 50 forwardly to the position shown, thereby opening the air outlet opening 27. As the air flows from the passageway 28 to the outlet opening 27, it is diverted in radially outward direction by the deflector member 54 in a smooth manner. The annular air stream flowing through the opening 27 then merges with the air flowing through the primary passageway 19 in a smooth manner before delivery to the engine intake opening 13.

When it is desired to move the apparatus from the subsonic position shown in Fig. 3 to the position shown in Fig. 2, the actuators 24 and 24a are jointly actuated to move their actuator shafts 23 and 25 in extending directions, whereupon the valve member 50 is returned to its blocking position and the spike member 22 is moved forwardly to the position shown in Fig. 2. During the movement of the spike member, the flange 37 is again returned into abutment with the shoulder 36 on the hub 33, so that further forward movement of the spike member 22 exerts a forwardly directed axial force moving the intermediate structure 29 to the blocking position shown in Fig. 2. Concomitantly therewith, the actuators 47 are retracted to move the leaves 31, 32 in diverging direction.

The actuators 24 and 24a may be regulated by the Mach meter (not shown) to position the apparatus in any one of the positions shown in Figs. 1, 2 and 3, as determined by the signals from the pressure probes 55, 56 and 57. The pressure probes determine the location of the normal shock wave N. Hence, any deviation of the normal shock wave N is sensed by the probes which provide the signals for initiating corrective actuator movement to reposition the spike member 22 and intermediate structure 29 as required to return the normal shock wave to the optimum position.

It will now be seen that the invention provides a highly versatile air intake structure which permits considerable travel of the spike member 22 and the intermediate structure 29 for maximum efficiency in a wide flight range from subsonic to supersonic speeds. Since the spreader member 39 is not connected to the leaves 31 and 32, maximum freedom of movement of the leaves is attained in both radial and axial directions.

It will further be seen that the invention provides a variable area air intake structure in which during subsonic conditions the air flow through the outer passageway 19 is augmented by air flow through the central passageway 28 and that during subsonic conditions the spike member is moved to its optimum position, while when the engine is operated at supersonic conditions the spike member is moved to the optimum position for such operation.

It will be understood that during supersonic flight speeds of varying values the position of the spike member may be modulated within its range of travel between the positions shown in Figs. 1 and 2 in a manner to anchor the oblique shock wave at the air inlet 15. Such modulation may also be controlled by means of the signals delivered to the Mach meter by the probe members 55, 56 and 57.

During subsonic flight conditions, the normal shock wave N is dissipated and the absence thereof is sensed by the probe members to condition the air intake structure 10 for subsonic flight as shown in Fig. 3.

While the invention has been shown in but one form, it will be obvious to those skilled in the art that it is not so limited, but is susceptible of various changes and modifications without departing from the spirit thereof.

What is claimed is:

1. An air intake structure for a supersonic aviation jet propulsion engine comprising an outer tubular shell structure, an inner tubular shell of smaller diameter than said outer shell and coaxially disposed relative thereto, said shells defining a primary air passageway of annular shape, said inner shell having an air intake at its forward end and an air outlet at its rearward end, said inner shell further having a central air passageway connected to said air inlet and outlet, said air outlet connecting said central passageway to said primary passageway, means for blocking said air intake opening comprising an axially movable spike member and annular array of leaf members interposed between said spike member and said inner shell, said leaf members being pivotally supported and movable jointly in a manner to define a frusto-conical surface of varying apical angle, means for jointly moving said leaf members and said spike member a limited distance in axial direction while blocking said air intake opening and for moving said spike member in rearward direction beyond said limited distance to unblock said air intake opening.

2. An air intake structure for a supersonic aviation jet propulsion engine comprising an outer tubular shell structure, an inner tubular shell of smaller diameter than said outer shell and coaxially disposed relative thereto, said shells defining a primary air passageway of annular shape, said inner shell having an air intake at its forward end and an air outlet at its rearward end, said inner shell further having a central air passageway connected to said air inlet and outlet, said air outlet connecting said central passageway to said primary passageway, means for blocking said air intake opening comprising an axially movable spike member and an annular array of mutually lapping leaf members interposed between said spike member and said inner shell, said leaf members being pivotally supported at their forward end portions and movable jointly in radial direction to define a frusto-conical air flow surface of varying apical angle extending from said spike member to said inner shell, means for urging said leaf members toward said inner shell, means for jointly moving said leaf members and said spike member a limited distance in axial direction while blocking said air intake opening and for moving said spike member in rearward direction beyond said limited distance to unblock said air intake opening.

3. An air intake structure for a supersonic aviation jet propulsion engine comprising an outer tubular shell structure, and axially extending fairing structure of smaller diameter than said outer shell and together therewith defining an outer air passageway of annular shape, said fairing structure having a body portion of circular cross-section, said body portion having an air intake at its forward end and an air outlet opening at its rearward end, said body portion further having a central air passageway connected to said air inlet and outlet, said air outlet connecting said central passageway to said outer passageway, means for blocking said air outlet opening, means for blocking said air intake opening comprising an axially movable tapered spike member and an intermediate structure including an annular array of leaf members interposed between said spike member and said body portion, means including a shaft for movably supporting said spike member, a hub member encompassing said shaft, said leaf members being pivotally supported at their forward end portions on said hub and movable radially to define a frusto-conical surface of varying apical angle, said spike member and said intermediate structure imparting a bullet shaped contour to said fairing structure when in the blocking position, a spreader member slidably supported on said shaft for urging said leaf members radially outwardly, means for jointly moving said intermediate structure and said spike member a limited distance in axial direction while blocking said air intake opening, means provided on said shaft for moving said intermediate structure in rearward direction beyond said limited distance to unblock said air intake opening, and means for moving said air outlet blocking means to an unblocking position concomitantly with movement of the intermediate structure to the unblocking position.

References Cited in the file of this patent

UNITED STATES PATENTS 2,638,738   Salter ---------------- May 19, 1953